T. YATES.
Coffee Pot.
No. 28,803.
Patented June 19, 1860.
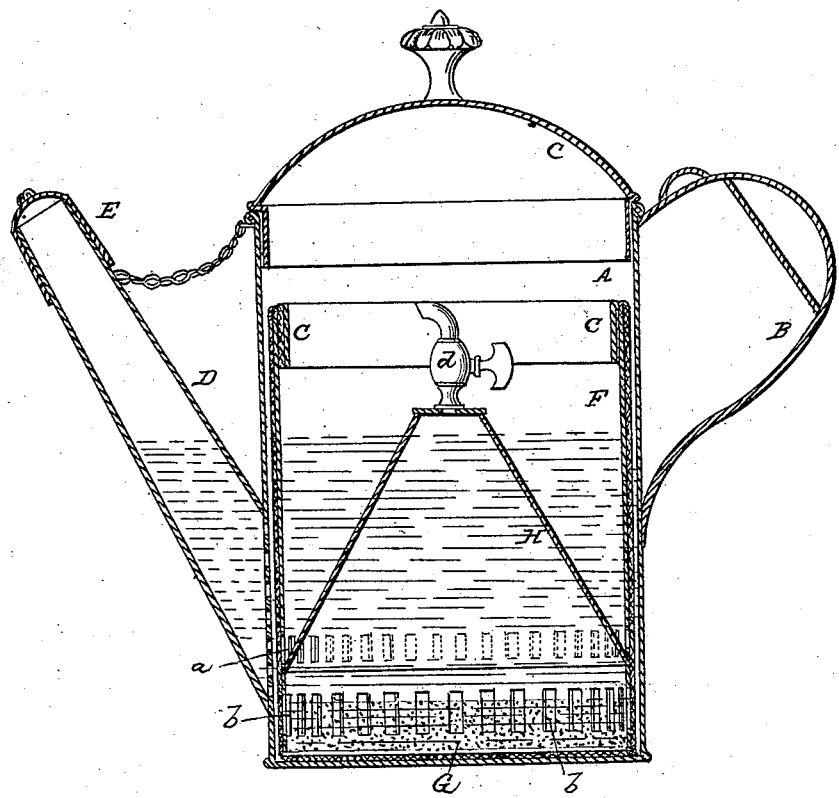
WITNESSES:
INVENTOR.

UNITED STATES PATENT OFFICE.

THOMAS YATES, OF DUBUQUE, IOWA.

COFFEE-POT.

Specification of Letters Patent No. 28,803, dated June 19, 1860.

*To all whom it may concern:*

Be it known that I, THOMAS YATES, of Dubuque, in the county of Dubuque and State of Iowa, have invented a new and Improved Coffee-Pot; and I do hereby declare that the following is a full, clear, and exact description of the same, reference being had to the accompanying drawing, forming a part of this specification, said drawing representing a vertical central section of my invention.

My invention consists in the arrangement of an inverted bell shaped chamber and a perforated cylinder both covered by a strainer, in combination with a water vessel of ordinary construction in such a manner that the essence of the coffee or other substance to be boiled, is retained under the bell shaped chamber, and on cooling said essence is absorbed by the water rushing in and filling the chamber.

To enable others skilled in the art to make and use my invention I will proceed to describe its construction and operation with reference to the drawing.

A represents a vessel of the form generally given to coffee pots, or vessels of a similar purpose. It is provided with a handle B, and with a cover C, and a spout D, serves to pour out the contents. This spout is covered by a cap E, which is removed only if it is desired to pour out some of the contents of the pot, so that the aroma of the coffee or other substance to be boiled has no chance to escape. Fitted into this pot is the cylinder F, which is open on the top and bottom and provided with two rows of perforations $a$, $b$, one close down to its bottom and the other a little higher up and a strainer G, of some fibrous material such as cotton cloth or of metal wire gauze is drawn over this cylinder, covering its sides and forming a bottom to the same as clearly shown in the drawing. A ring $c$, which fits tightly into the top of the cylinder retains the strainer, which is bent over the edge of the cylinder and secured by forcing in the ring so that it cramps the end of the strainer between its outside and the inside of the cylinder. This strainer also covers the perforations in the sides of the cylinder.

Fastened to the inner side of the cylinder F, is the inverted bell shaped chamber H, which is open at the bottom and closed at the top, and a faucet $d$, in its top serves to regulate the flow of the air or steam which may be contained in the interior of said bell shaped chamber.

The operation is as follows. The ground coffee or other substance to be boiled is placed in the vessel A, inside the cylinder F, and sufficient water is poured in to extract the essence of the coffee or other substance, and the vessel is now placed on a stove or heated in any other convenient manner. As the water begins to boil, the steam, which forms in the interior of the bell shaped chamber, drives out the water, the air being let out by the faucet $d$, and the essence or aroma of the coffee collects under said chamber. On cooling, the steam contained in this chamber condenses and a vacuum is formed, causing the water from the outside to rush in and to absorb the aroma contained in the chamber. In pouring out the beverage the sediment is retained by the strainer G.

This coffee pot is very simple in its construction, it can easily be managed by the most inexperienced person, it is easily cleansed and it gives the best result, that can be expected.

Having thus fully described my invention what I claim as new and desire to secure by Letters Patent is—

The arrangement and combination of the inverted bell shaped chamber H, perforated cylinder F, strainer G, and vessel A, constructed and operating substantially in the manner and for the purpose set forth.

THOMAS YATES.

Witnesses:
C. F. HETLICH,
B. PLASTER.